Jan. 8, 1924.
E. HERMAN
ANIMAL HOPPLE
Filed Dec. 7, 1922
1,480,443
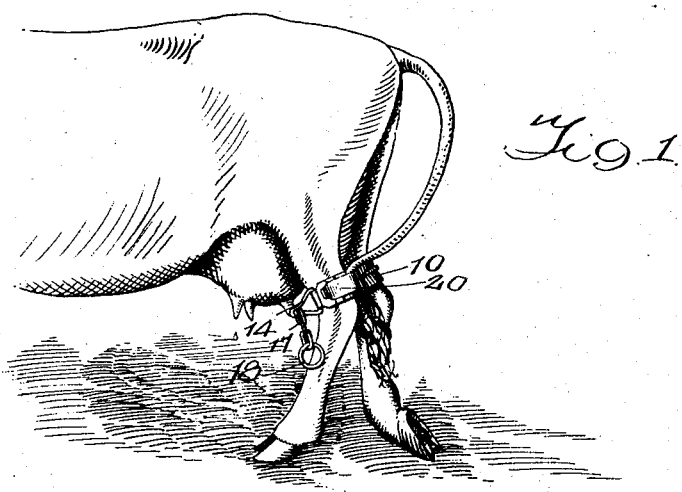
Fig. 1.
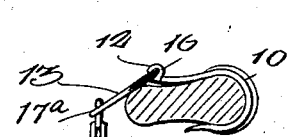
Fig. 2.
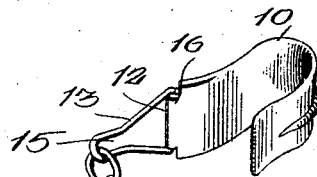
Fig. 3.
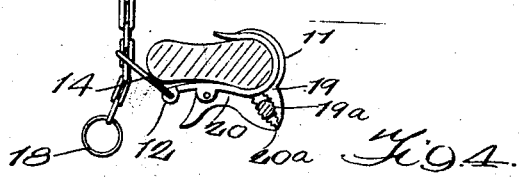
Fig. 4.
Fig. 5.
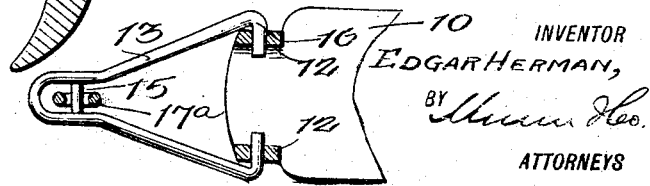
WITNESSES
INVENTOR
Edgar Herman,
BY
ATTORNEYS Patented Jan. 8, 1924.

1,480,443

UNITED STATES PATENT OFFICE.

EDGAR HERMAN, OF FAIRFIELD, IOWA.

ANIMAL HOPPLE.

Application filed December 7, 1922. Serial No. 605,415.

*To all whom it may concern:*

Be it known that I, EDGAR HERMAN, a citizen of the United States, and a resident of Fairfield, in the county of Jefferson, and State of Iowa, have invented certain new and useful Improvements in Animal Hopples, of which the following is a specification.

This invention relates to animal hopples, and more particularly to hopples used when milking cows.

An object of the invention is to provide a hopple, which when attached to the cow's legs will prevent the cow from kicking, and at the same time securely hold the cow's tail and prevent switching thereof.

Another object is to provide a hopple that can be readily applied and which may be adjusted to hopple the cow to a greater or less degree.

With these and other objects in view the invention consists in certain novel features of construction, arrangement and combination of parts as will be hereinafter described and pointed out in the claim, reference being had to the accompanying drawings in which—

Figure 1, is a perspective view showing the device applied to the hind legs of a cow, Figure 2, is a view showing relative position of parts when in use.

Figure 3, is a perspective view of the device detached from the cow,

Figure 4, is an enlarged sectional fragmentary view showing a detail of the tail clamp, Figure 5 is a detail sectional view showing connection of a clevis.

Referring to the drawings it will be seen that the device comprises a pair of shackles 10 and 11 made of cast or pressed steel or other metal and formed to the shape of the cow's hocks, the general form of the body portion of each shackle being hookshaped, the outer members of the shackles being slightly longer than the inner members.

The shackles are curved on their inner surface which will prevent a sharp or rough bearing upon the cow's hocks.

At the free end of the outer member of each of the shackles at the outer side thereof a pair of tubular eyes 12 are formed and in these tubular eyes is journalled turned ends 16 of the arms of one of the open clevises 13 or 14, which may be made of wire with one end secured to the outer member of one of the shackles in the manner described, and the other end contracted as at 15.

One end of a light chain 17 is secured to the contracted end of clevis 13, this chain then passing through the clevis 14, as shown in Figure 3, the free end of this chain being provided with a large ring 18.

Upon the shackle 11, and extending outwardly therefrom near the bent portion is a rigid projection 19 having teeth or serrations 19$^a$ upon one face, and each of which clevises constitutes one jaw of a clamp. Upon the same side of this shackle 11, is pivotally mounted a finger piece 20 constituting the other jaw of the clamp, and having a toothed or serrated face 20$^a$ opposing the toothed face 19$^a$ of the other jaw 19; the movable jaw being controlled by a spring 21 which is practically concealed by the finger piece.

It will be noted that the chain 17 is permanently connected by a link 17$^a$ at one end to the clevis 13, and while the chain can pass freely through the wider portion of the clevis 14 it will be prevented from being pulled therefrom by the large ring 18 at the free end of the chain.

In operation the shackle 10 is placed on the right leg of the cow over the hock; the chain 17 is then passed forwardly around the front part of the leg with the chain entirely free from the leg, as indicated in Figure 2, and across the front part of the left leg so that shackle 11 can be applied to the left leg in proper location; after this has been done, the operator pulls on the chain 17 by means of ring 18, while the chain is in the wider portion of the clevis 14, and thus draws the legs of the cow together, as close as desired; the chain is then moved outwardly with link flatwise into the narrow or contracted part of the clevis 14 holding it securely and preventing any backward movement of the cow's leg in the act of kicking.

The clamp on outside of shackle 11 is for the purpose of holding the cow's tail, and when the shackles have been applied, as just described, the movable jaw 20 is opened by pressure on the finger piece, the cow's tail placed in between the jaws, and when releasing the pressure the spring 21 causes the movable jaw to grip the cow's tail holding it securely from switching.

From the above it will be clearly understood that a simple, cheap and efficient device has been provided which will prevent the annoyance due to upsetting the milk pail by kicking, and will also securely hold the cow's tail and prevent switching of the same.

What I claim is:

In a device of the character described, a substantially hook-shaped shackle having the inner surface thereof smooth, one of the side members of the shackle being longer than the other side member and having at its outer end at the outer side thereof a pair of tubular eyes, said tubular eyes being in alignment transversely of the shackle, and a clevis having the inturned end portions of the arms thereof journalled in said tubular eyes, said clevis having a relatively narrow free end portion adapted to engage with the links of a chain.

EDGAR HERMAN.